United States Patent
Herron et al.

(10) Patent No.: US 7,133,501 B2
(45) Date of Patent: Nov. 7, 2006

(54) METHOD AND APPARATUS FOR SOLICITING PERSONAL VOICE RECORDINGS FOR A VOICE-DIALING SYSTEM

(75) Inventors: Daniel Thomas Herron, Sammamish, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/945,480

(22) Filed: Sep. 20, 2004

(65) Prior Publication Data

US 2006/0062381 A1   Mar. 23, 2006

(51) Int. Cl.
*H04M 1/64* (2006.01)
(52) U.S. Cl. .............. 379/88.03; 379/201.12; 379/218.01
(58) Field of Classification Search ............ 379/88.03, 379/201.12, 218.01
See application file for complete search history.

(56) References Cited

U.S. PATENT DOCUMENTS 5,557,659 A * 9/1996 Hyde-Thomson ........ 379/88.13
6,650,738 B1 * 11/2003 Pershan et al. .......... 379/88.03
6,671,354 B1 * 12/2003 Mahoney ................. 379/88.03
2001/0038689 A1 * 11/2001 Liljestrand et al. .... 379/201.03
2002/0141557 A1 * 10/2002 Strandberg ............. 379/210.01
2004/0047453 A1 * 3/2004 Fraser ..................... 379/88.18

OTHER PUBLICATIONS

"FUJITSU Call Center System CCRM-1 Product Description" FUJITSU Call Center System CCRM-1—Product Description, FUJITSU, Sep. 2002.
Nitin Sawhney, "Nomadic Radio: Speech and Audio Interaction for Contextual Messaging in Nomadic Environments", ACM Transactions on Computer-Human Interaction, vol. 7, No. 3, Sep. 2000, pp. 353-383.
"FacetPhone", FacetCorp, at least by Sep. 13, 2004.

* cited by examiner

*Primary Examiner*—Fan Tsang
*Assistant Examiner*—Hemant S. Patel
(74) *Attorney, Agent, or Firm*—John D. Veldhuis-Kroeze; Westman, Champlin & Kelly, P.A.

(57) ABSTRACT

A method of facilitating interaction between a user and an automated system is provided. The method includes generating a graphical user interface on a display, with the graphical user interface inviting the user to provide an input to initiate execution of an operation. Upon receipt of an input from the user, a telephone call is automatically generated or initiated from the automated system to the user. The automated system can then prompt the user as required to execute the operation.

11 Claims, 3 Drawing Sheets

METHOD AND APPARATUS FOR SOLICITING PERSONAL VOICE RECORDINGS FOR A VOICE-DIALING SYSTEM

BACKGROUND OF THE INVENTION

The present invention generally pertains to voice-activated command systems. More specifically, the present invention pertains to methods and apparatus for aiding potential call recipients in setting up or maintaining automatic voice-dialing systems.

Automatic voice-dialing systems typically use an introductory message recorded by a voice talent (a person hired for their voice) to greet callers, and to inquire from the callers who they would like to contact. A caller then speaks the name of the person he or she wishes to contact, and the voice-dialing system uses a speech recognition technique to identify or recognize the name of this intended recipient of the call. Typically, the voice-dialing system confirms the recognized name with the caller prior to connecting the call to the phone or voice mail associated with the recognized name.

Automatic voice-dialing systems are a cost-effective alternative to human operators. For systems that serve large numbers of people (for example, a company with more than 50,000 employees), however, it becomes impractical to use a voice-talent to record the name of each reachable person ("user"). Yet without a recording of each user's name, the voice-dialer would be forced to use text-to-speech when speaking the name, as is typically used when confirming it (for example, using a prompt such as "Did you say JOHN SMITH?").

The cost (in time and money) of recording each name can be substantially reduced by distributing the task among the users—i.e., asking each user to record his or her own name. This is a familiar task to users of most voice-mail systems. It is also a task that is often avoided, due to the perceived complexity or time required to make the recording.

The present invention provides solutions to one or more of the above-described problems and/or provides other advantages over the prior art.

SUMMARY OF THE INVENTION

A method of facilitating interaction between a user and an automated system is provided. The method includes generating a graphical user interface on a display, with the graphical user interface inviting the user to provide an input to initiate execution of an operation. Upon receipt of an input from the user, a telephone call is automatically generated or initiated from the automated system to the user. The automated system can then prompt the user as required to execute the operation. For example, the automated system can be an automatic voice-dialing system or application in which personal name recordings or greeting recordings of potential call recipients are stored for use in verifying voice recognition results and otherwise aiding callers. To ensure a high rate of compliance by the users (potential call recipients) in recording the names or greetings, the automated system calls the users and guides them through the process.

Other features and benefits that characterize embodiments of the present invention will be apparent upon reading the following detailed description and review of the associated drawings.

DETAILED DESCRIPTION OF ILLUSTRATIVE EMBODIMENTS

I. Exemplary Environments

Various aspects of the present invention pertain to automated systems such as voice-dialing systems. Examples of well-known computing systems, environments, and/or configurations that may be suitable for use with the invention include, but are not limited to, personal computers, server computers, hand-held or laptop devices, multiprocessor systems, microprocessor-based systems, set top boxes, and programmable dialing applications. Embodiments of the present invention can be implemented in association with a call routing system, wherein a caller identifies with whom they would like to communicate and the call is routed accordingly. Embodiments can also be implemented in association with a voice message system, wherein a caller identifies for whom a message is to be left and the call or message is sorted and routed accordingly. Embodiments can also be implemented in association with a combination of call routing and voice message systems. It should also be noted that the present invention is not limited to call routing and voice message systems. These are simply examples of automated systems within which embodiments of the present invention can be implemented.

Prior to discussing embodiments of the present invention in detail, exemplary computing environments within which the embodiments and their associated systems can be implemented will be discussed.

Figure 1:
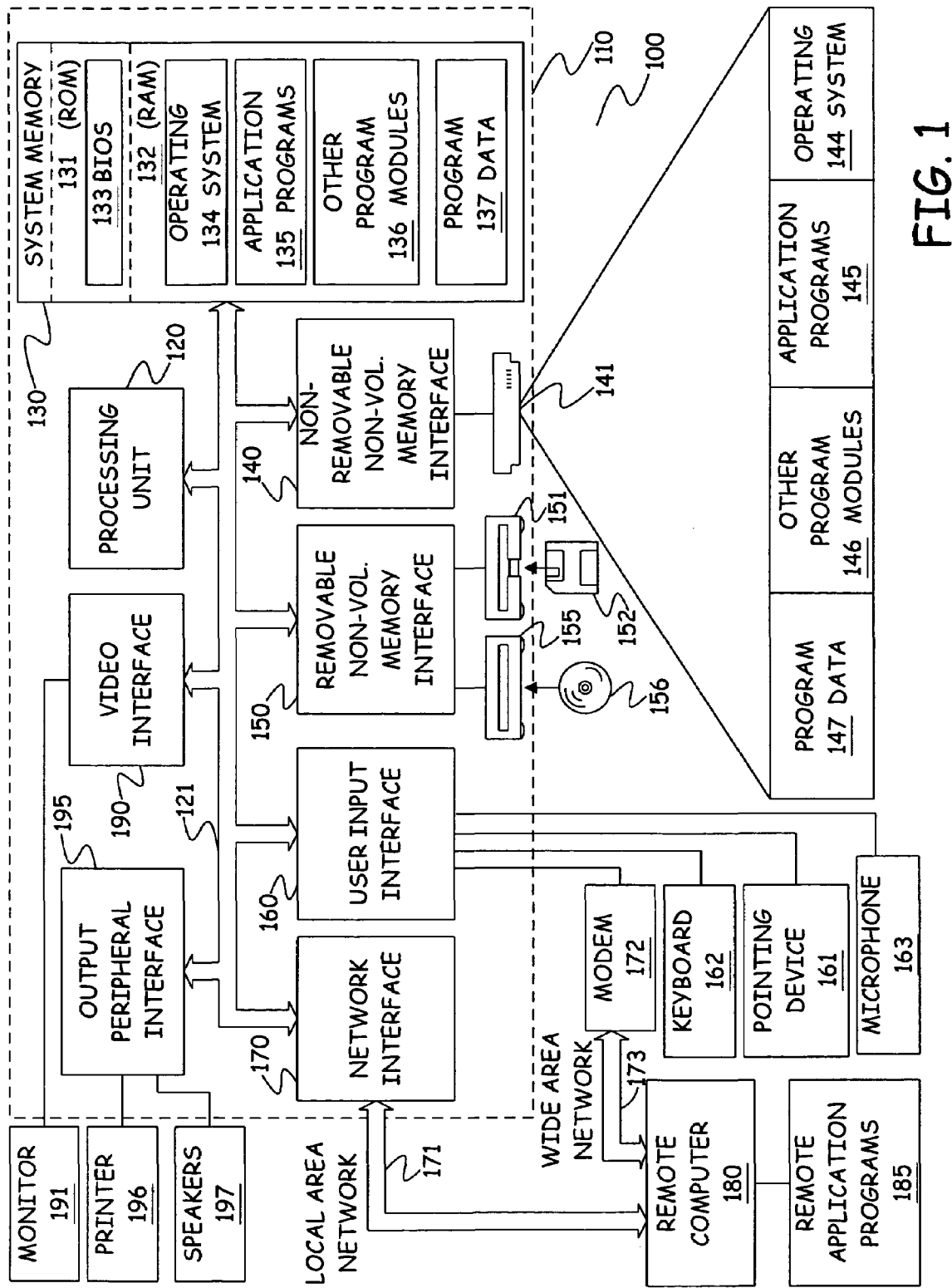
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can also be carried out on a server, a computer devoted to message handling, or on a distributed system in which different portions of the present invention are carried out on different parts of the distributed computing system.

II. Voice-Dialing System Overview

Figure 2:
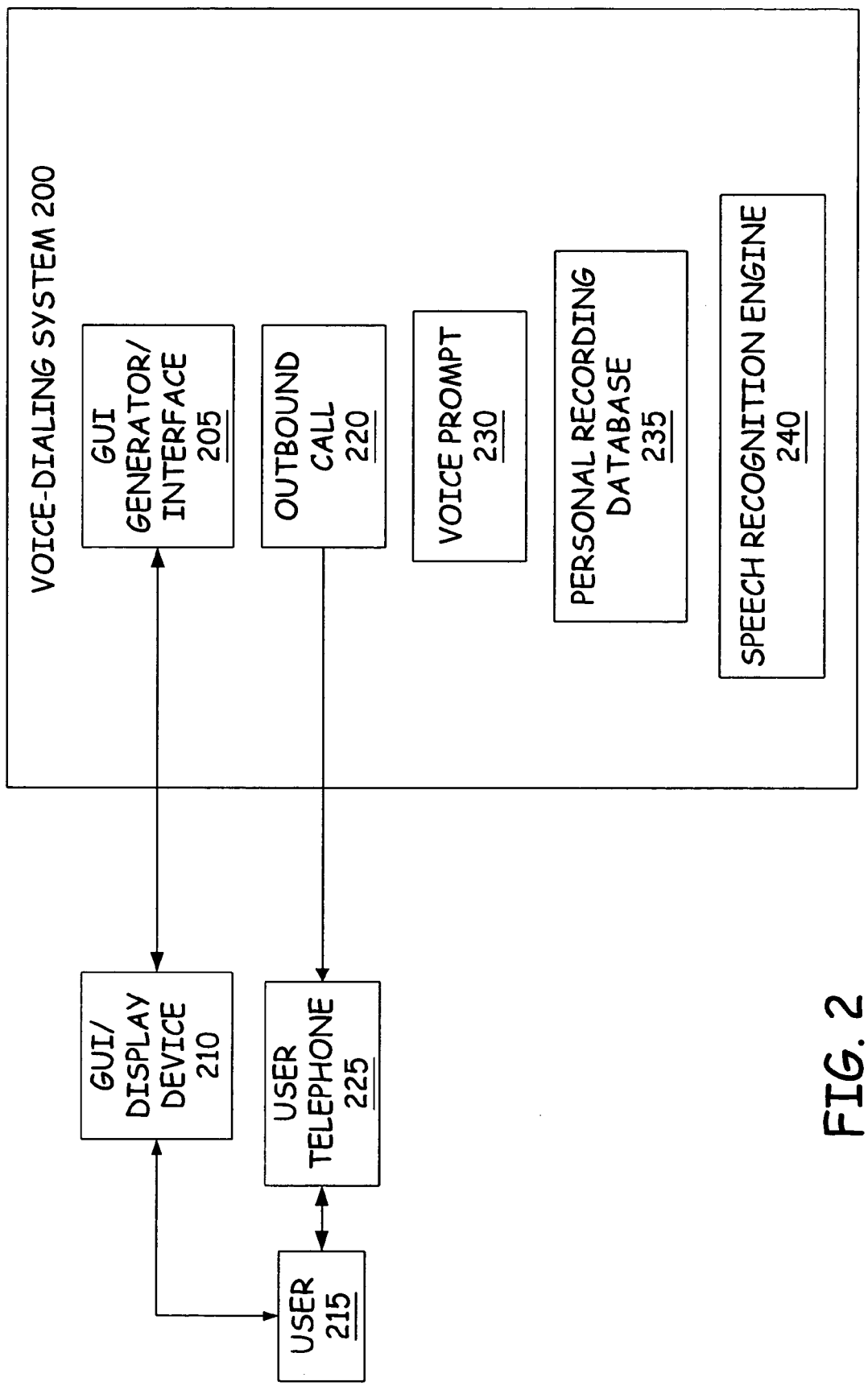
FIG. 2 is a schematic block diagram representation of an automated system, such as a voice-dialing system.

FIG. 2 is a schematic block diagram of an automated system 200 in which the present invention can be used and embodied. In an exemplary embodiment, automated system 200 is or includes a voice-dialing system of the type used to assist callers in connecting to intended call recipients (users). The present invention is useful in addressing the above-described problem of users avoiding the task of recording their names, greetings or other information for use in such voice-dialing systems. The present invention provides a mechanism on a graphical user interface (GUI), such as a web page, that requires or invites users to click a single button in order to trigger an outbound phone call from the automated system to their telephone. Upon answering, users are led through a dialog that prompts them to record their names, plays the recording back to them, and allows them to accept or reject the recording.

In the example embodiment shown in FIG. 2, system 200 includes a GUI generator/interface component 205, an outbound call generating component 220, a voice prompt generating or storing component 230, a personal recording database 235 and a speech recognition engine 240. One or more of these components, for example speech recognition engine 240, can be excluded from system 200 and accessed from another system or server as needed. System 200 facilitates interaction with user 215 by generating (for example using component 205) a GUI which includes a textual instruction or invitation for the user to provide an input to initiate execution of an operation. The GUI is illustrated diagrammatically at 210 in combination with a corresponding display device. The user then provides an input to system 200, for example in the form of mouse click on GUI 210, initiating execution of the specified operation. In this example, the operation can be recording of the user's name, an outgoing greeting, or other recordings for use by the voice-dialing system.

In response to the input, an outbound call generating component 220 of system 200 automatically generates a telephone call to the telephone 225 of user 215. Using voice prompts from voice prompt generating or storing component 230, system 200 guides the user through the process. In the illustrated embodiment, system 200 includes a personal recording database 235 which stores personal recordings from user 215 which are generated using these methods. System 200 also includes, or has access to, a speech recognition engine which is used to recognize verbal commands from user 215 during the process, so that system 200 can respond accordingly.

It must be noted that the illustrated components of system 200 are examples, and that other components can be used instead to implement the methods of the present invention. Further, system 200 need not be a voice-dialing system, but can instead be other types of automated systems.

III. Example of Collection of Personal Recordings

As described above, in some embodiments of the present invention, the task to be executed relates to the collection of personal recordings in a voice-dialing system. The following is a more particular example embodiment, in which the collection of personal recordings is carried out as follows:

1) Web-based trigger: A web site or other GUI 210 can include a section entitled, for example, "Voice Signature". This section tells the user whether or not a personal recording already exists, and describes briefly why personal recordings are important. The text also tells users that clicking a button, for example labeled "Call Me" will trigger a call to their office phones, so that they can create or edit their recordings.

2) Outbound dialog: When the "Call Me" button is clicked, an outbound call to the appropriate office phone number is triggered and a dialog begun, using a speech server system, for example embodying speech recognition engine 240. The dialog can be short and simple, for example consisting of:

a) [Only if the user already has a personal recording] A presentation of the user's existing recording and confirmation that the user would like to make a new recording;
   b) A prompt asking the user to speak his or her name after the beep (repeated until the user says something); and
   c) The recorded audio data is normalized for loudness, and then played back to the user, who is asked to accept or reject the recording.

3) Integration of recordings into the prompt database. New recordings are aligned to the user's name (using the speech recognizer 240), and integrated into a prompt database 235 of users' personal recordings. Upon completion of the update, the new recording is used when confirming that person's name.

IV. Example General Method

Figure 3:
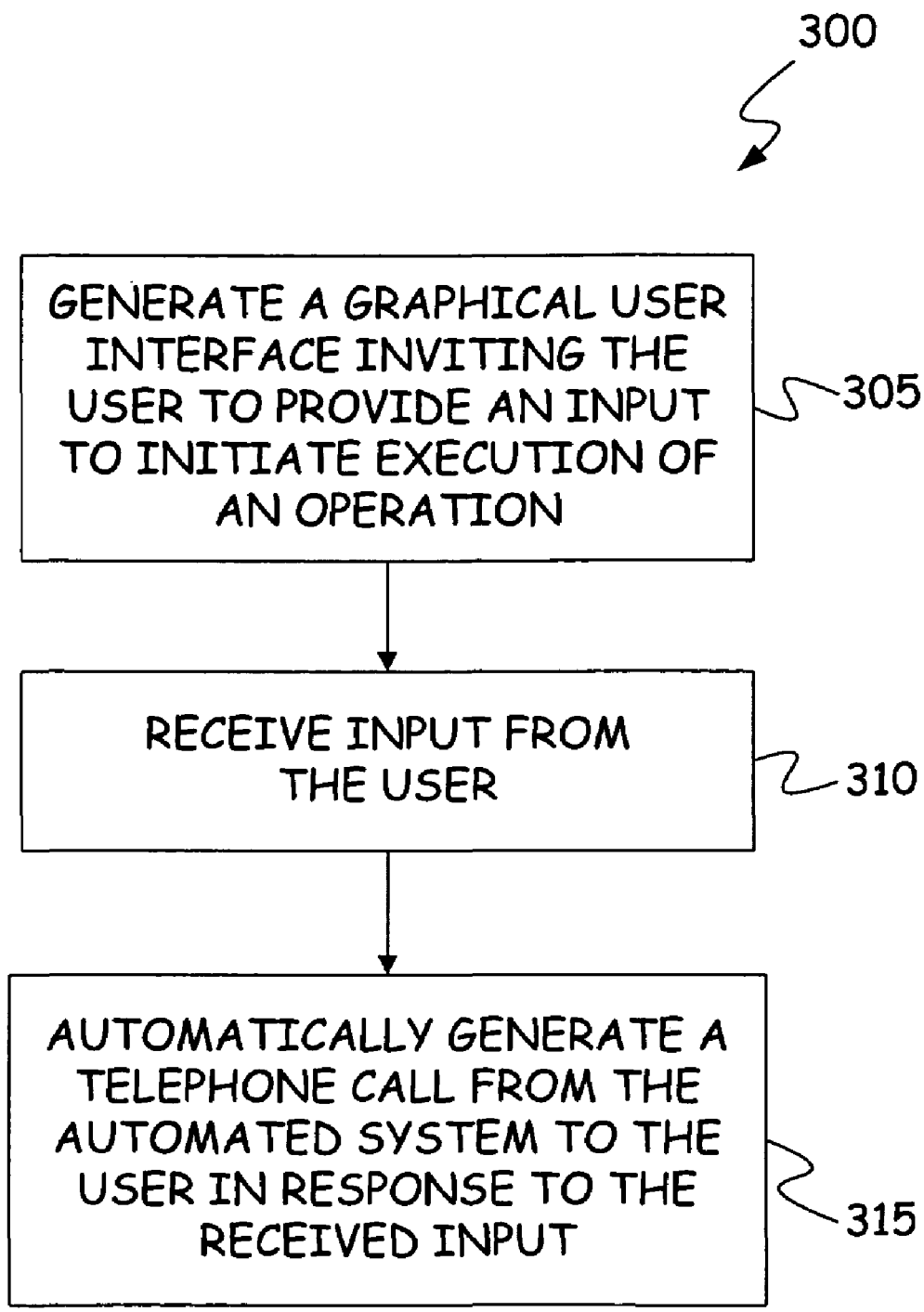
FIG. 3 is a flow diagram illustrating steps of a general method of the present invention.

While the example embodiments of systems and methods of the present invention have been described with reference to voice-dialing systems, the present invention more generally includes systems and methods of facilitating interaction between a user and an automated system. Such a general method is illustrated in flow diagram 300 shown in FIG. 3. As shown in FIG. 3, a method of the present invention includes the step shown at block 305 of generating a graphical user interface on a display. As described previously, the graphical user interface invites the user to provide an input to initiate execution of an operation. After receiving the input from the user at the step shown at block 310, the automated system automatically generates a telephone call to the user to execute the operation. The telephone call can include voice prompts which guide the user through the process.

Voice-only telephony interactions have generally been considered to be "dial-in" systems (the user calls a number and interacts with the system) or "dial-out" (some event causes the system to trigger an outbound call to a user: for example, a system might call to remind dentist's patients of their upcoming appointments.) The present invention can be broadly extended to be embodied in any system in which the user initiates the outbound call (from the system to the user) by clicking on a button or link. Such a system can be used in any case where users would find it easier, more comfortable, or more convenient to interact via speech than via typing, but do not wish to dial the phone themselves.

Although the present invention has been described with reference to particular embodiments, workers skilled in the art will recognize that changes may be made in form and detail without departing from the spirit and scope of the invention.

What is claimed is:

1. A method of obtaining personal recordings of potential call recipients for a voice-dialing system, the method comprising:

generating a graphical user interface on a display, the graphical user interface inviting a user to provide an input to initiate execution of a personal recording operation;

receiving an input from the user; and automatically generating a telephone call, from the voice-dialing system to the user in response to the received input, to facilitate voice interaction between the user and the voice-dialing system to execute the personal recording operation to obtain a personal recording from the user for use by the voice-dialing system in connecting incoming calls to the user.

2. The method of claim 1, wherein generating the graphical user interface further comprises generating a web page with text inviting the user to provide the input to initiate execution of the personal recording operation.

3. The method of claim 2, wherein receiving the input from the user further comprises receiving the input from the user through the graphical user interface.

4. The method of claim 1, and further comprising generating, in the telephone call between the voice-dialing system and the user, voice prompts to guide the user through the personal recording operation.

5. The method of claim 4, and further comprising storing the personal recording from the user in a personal recording database.

6. An automatic voice-dialing system configured to implement the method of claim 1.

7. A computer readable medium having computer-executable instructions for performing steps comprising:

generating a graphical user interface on a display, the graphical user interface inviting a user to provide an input to initiate execution of a personal recording operation with an automatic voice-dialing system;

receiving an input from the user; and automatically generating a telephone call, from the voice-dialing system to the user in response to the received input, to facilitate voice interaction between the user and the voice-dialing system to execute the personal recording operation to obtain a personal recording from the user for use by the voice-dialing system in connecting incoming calls to the user.

8. The computer readable medium of claim 7, wherein generating the graphical user interface further comprises generating a web page with text inviting the user to provide the input to initiate execution of the personal recording operation.

9. The computer readable medium of claim 8, wherein receiving the input from the user further comprises receiving the input from the user through the graphical user interface.

10. The computer readable medium of claim 9, and further having computer-executable instructions for performing a further step comprising generating, in the telephone call between the voice-dialing system and the user, voice prompts to guide the user through the personal recording operation.

11. A voice-dialing system, comprising:

a graphical user interface component configured to generate a graphical user interface on a display, the graphical user interface inviting a user to provide an input to initiate execution of a personal recording operation;

an outbound call generating component configured to automatically generating a telephone call, from the voice-dialing system to the user in response to an input received through the graphical user interface, to facilitate voice interaction between the user and the voice-dialing system to execute the personal recording operation to obtain a personal recording from the user for use by the voice-dialing system in connecting calls to the user;

a voice prompt component configured to generate voice prompts during the telephone call from the voice-dialing system to the user to guide the user through the personal recording operation; and a personal recording database which stores the personal recording for use by the voice-dialing system in connecting incoming calls to the user.

* * * * *